(12) United States Patent
Shen et al.

(10) Patent No.: US 12,221,009 B2
(45) Date of Patent: Feb. 11, 2025

(54) POWER SUPPLY MANAGEMENT DEVICE

(71) Applicant: POWERSHOW LIMITED, New Taipei (TW)

(72) Inventors: Yu-Chih Shen, New Taipei (TW); Yu Sun, New Taipei (TW); Chiou-Shann Fuh, New Taipei (TW); Tien-Yueh Dai, New Taipei (TW); Pei-Jing Yu, New Taipei (TW)

(73) Assignee: POWERSHOW LIMITED, New Taipei (TW)

( * ) Notice: Subject to any disclaimer, the term of this patent is extended or adjusted under 35 U.S.C. 154(b) by 52 days.

(21) Appl. No.: 18/194,809

(22) Filed: Apr. 3, 2023

(65) Prior Publication Data
US 2023/0398900 A1 Dec. 14, 2023

(30) Foreign Application Priority Data

Jun. 10, 2022 (TW) .................................. 111121588
Jan. 12, 2023 (TW) .................................. 112101303

(51) Int. Cl.
*B60L 58/12* (2019.01)
*B60L 58/24* (2019.01)
*H01M 10/42* (2006.01)

(52) U.S. Cl.
CPC ............... *B60L 58/12* (2019.02); *B60L 58/24* (2019.02); *B60L 2200/12* (2013.01)

(58) Field of Classification Search
CPC ....... B60L 58/12; B60L 58/24; B60L 2200/12

USPC ........................................................ 307/10.1
See application file for complete search history.

(56) References Cited

U.S. PATENT DOCUMENTS

| | | | |
|---|---|---|---|
| 2016/0303989 A1* | 10/2016 | Lei ................... | H02J 7/007182 |
| 2017/0282719 A1* | 10/2017 | Chen ...................... | B60L 58/10 |
| 2019/0157641 A1* | 5/2019 | Koropachinsky ..... | B60L 3/0015 |
| 2019/0389407 A1* | 12/2019 | Takagi ................. | H01M 50/209 |
| 2022/0154679 A1* | 5/2022 | Kwak ................... | B60R 16/033 |
| 2024/0006930 A1* | 1/2024 | Li ........................... | H02M 3/04 |
| 2024/0025287 A1* | 1/2024 | Mouchet ................. | B60L 53/57 |

* cited by examiner

*Primary Examiner* — Rexford N Barnie
*Assistant Examiner* — Swarna N Chowdhuri
(74) *Attorney, Agent, or Firm* — BACON&THOMAS,PLLC (57) ABSTRACT

The invention is a power supply management device for intelligent motorcycle, comprising a power device and a power supply management system. The power supply management system is electrically connected to the power device. The power supply management system includes a processor, an input module connected to the processor, a link module connected to the processor, a voltage modulation module connected to the processor, a protection module connected to the processor, and an output module connected to the processor. Thereby, the power supply management system can be electrically connected to the rechargeable battery of the power device, serving for power supply and power management in various demands, and in turn, for effective control and management of the power to meet the operation requirement of the intelligent motorcycle.

5 Claims, 8 Drawing Sheets

POWER SUPPLY MANAGEMENT DEVICE

BACKGROUND OF THE INVENTION

Field of the Invention

The invention relates to a power supply management device for intelligent motorcycle, especially to an external equipment that can be installed and electrically connected to an intelligent motorcycle, acting as a power supply management device for the intelligent motorcycle in order for power supply and power management in various demands, and in turn, for effective control and management of the power to meet the operation requirement of the intelligent motorcycle.

Descriptions of the Related Art

A battery disposed in a regular motorcycle usually only used for powering various equipments on a motorcycle without various managements for power control. The battery disposed in the regular motorcycle, when connected to other equipments, such as an AI computer, a camera, a spotlight, a display device, a heat dissipation device or other devices, is less able to meet the operation requirements.

SUMMARY OF THE INVENTION

The major objective of the invention is to improve the persistent existence of the above-mentioned conventional defects by disposing a power supply management device for motorcycle, which is an external equipment that can be installed and electrically connected to an intelligent motorcycle, acting as a power supply management device for the intelligent motorcycle in order for power supply and power management in various demands, and in turn, for effective control and management of the power to meet the operation requirement of the intelligent motorcycle.

To achieve the objective mentioned above, the invention is a power supply management device for intelligent motorcycle, comprising: a power device and a power supply management system. The power supply management system is electrically connected to the power device. The power supply management system includes a processor, an input module connected to the processor, a link module connected to the processor, a voltage modulation module connected to the processor, a protection module connected to the processor, and an output module connected to the processor.

In the said power supply management system for intelligent motorcycle, the power device includes a housing, a rechargeable battery provided on the housing, a heat dissipation module provided on the housing, two grasp sections provided on the housing, and a circuit board set provided on the housing; the power supply management system is provided on the housing and the processor is electrically connected to the rechargeable battery.

In the said power supply management device for intelligent motorcycle, the processor has a power control module for operation control and work computation of the power device, the input module, the link module, the voltage modulation module, the protection module and the output module; the rechargeable battery acts as a power source for operation of an AI computer, a camera, a spotlight, a display device or a heat dissipation device.

In the said power supply management device for intelligent motorcycle, the input module and the output module are electric connectors.

In the said power supply management device for intelligent motorcycle mentioned above, the link module serves for the Bluetooth communication protocol.

In the said power supply management device for intelligent motorcycle, the voltage modulation module can modulate the output voltage of DC19V, DC12V, or DC5V from the power device.

In the said power supply management device for intelligent motorcycle, the protection module cooperates with the power device to perform over-current protection, short-circuit protection, over-voltage protection, low-voltage alert and over-temperature protection.

In the said power supply management device for intelligent motorcycle, the processor is further connected with a switch unit, the switch unit serving for activation and deactivation of the power device.

In the said power supply management device for intelligent motorcycle, the power device is normally electrically connected to a battery for activation of a motorcycle, and the voltage modulation module can modulate the power device to output DC12V for power supply in emergency rescue.

In the said power supply management device for intelligent motorcycle, the power supply management system can detect a voltage value of the battery for activation lower than DC5V, such that the voltage modulation module can modulate the output power of the power device supplying power to the battery for activation.

In the said power supply management device for intelligent motorcycle mentioned above, the input module is activated when the voltage value of the battery for activation is higher than DC13V; the input module is deactivated when the voltage value of the battery for activation is lower than DC12V.

BRIEF DESCRIPTION OF THE DRAWINGS

FIG. 4-1 is a top view of a power supply management device according to the invention.

FIG. 4-2 is a front view of a power supply of a power supply management device according to the invention.

FIG. 5-1 is a left side view of a power supply management device according to the invention.

FIG. 5-2 is a right side view of a power supply management device according to the invention.

DETAILED DESCRIPTION OF THE PREFERRED EMBODIMENT

Figure 1:
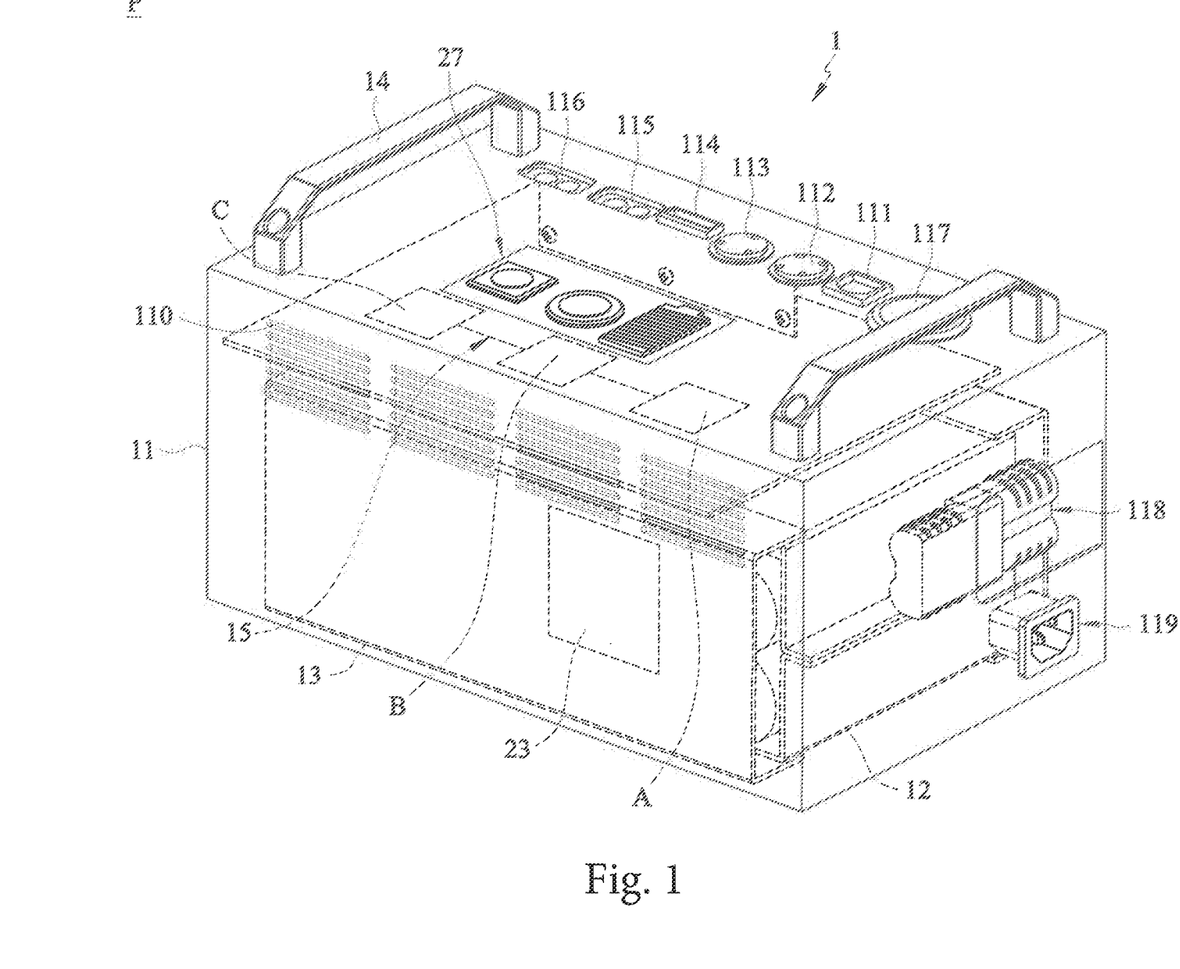
FIG. 1 is a schematic diagram showing a three-dimensional appearance of a power supply management device for intelligent motorcycle according to the invention.
Figure 2:
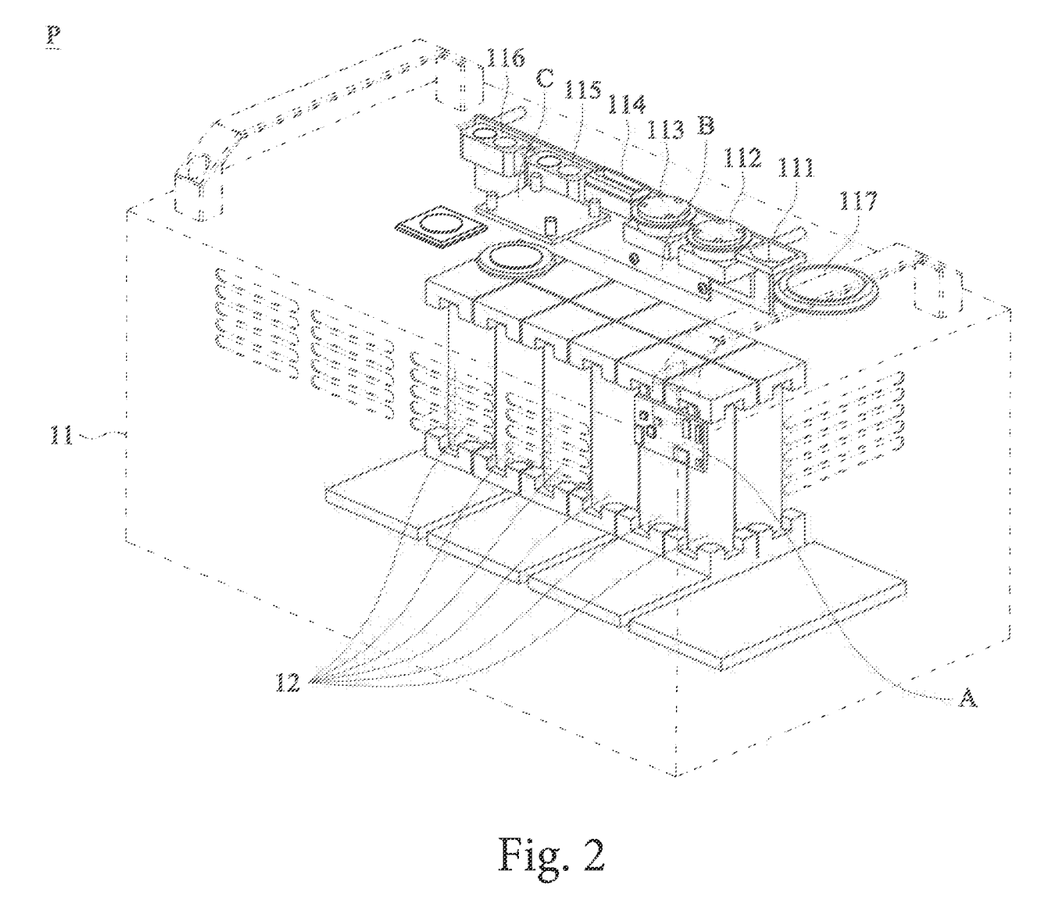
FIG. 2 is a schematic diagram showing an internal structure of a power supply management device according to the invention.
Figure 3:
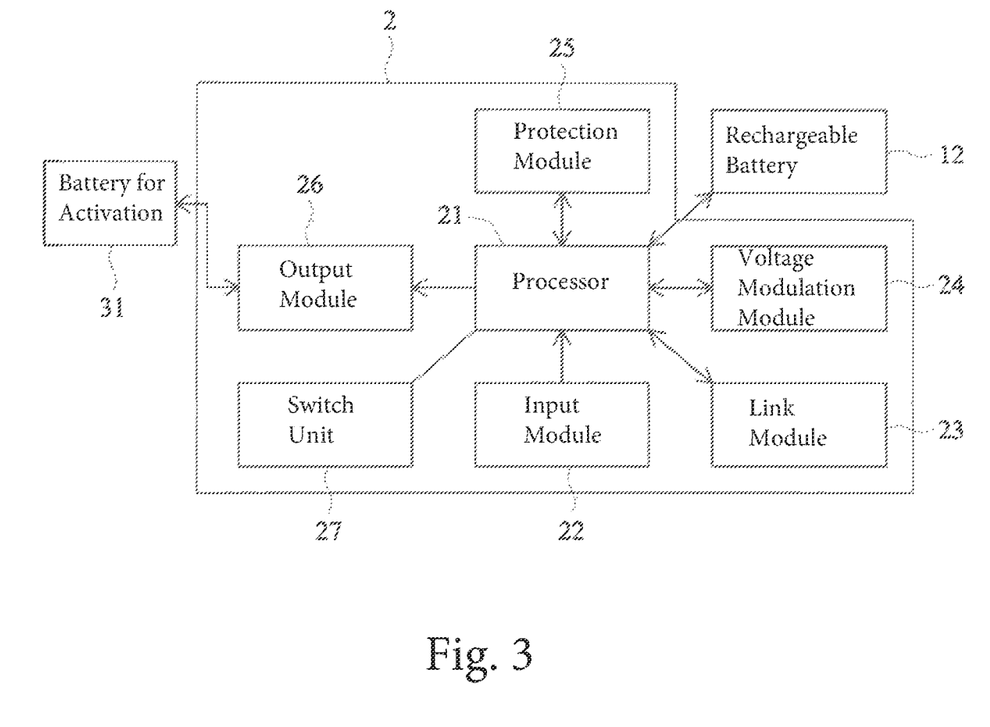
FIG. 3 is a schematic diagram showing processing blocks of a power supply management system for intelligent motorcycle according to the invention.
Figure 6:
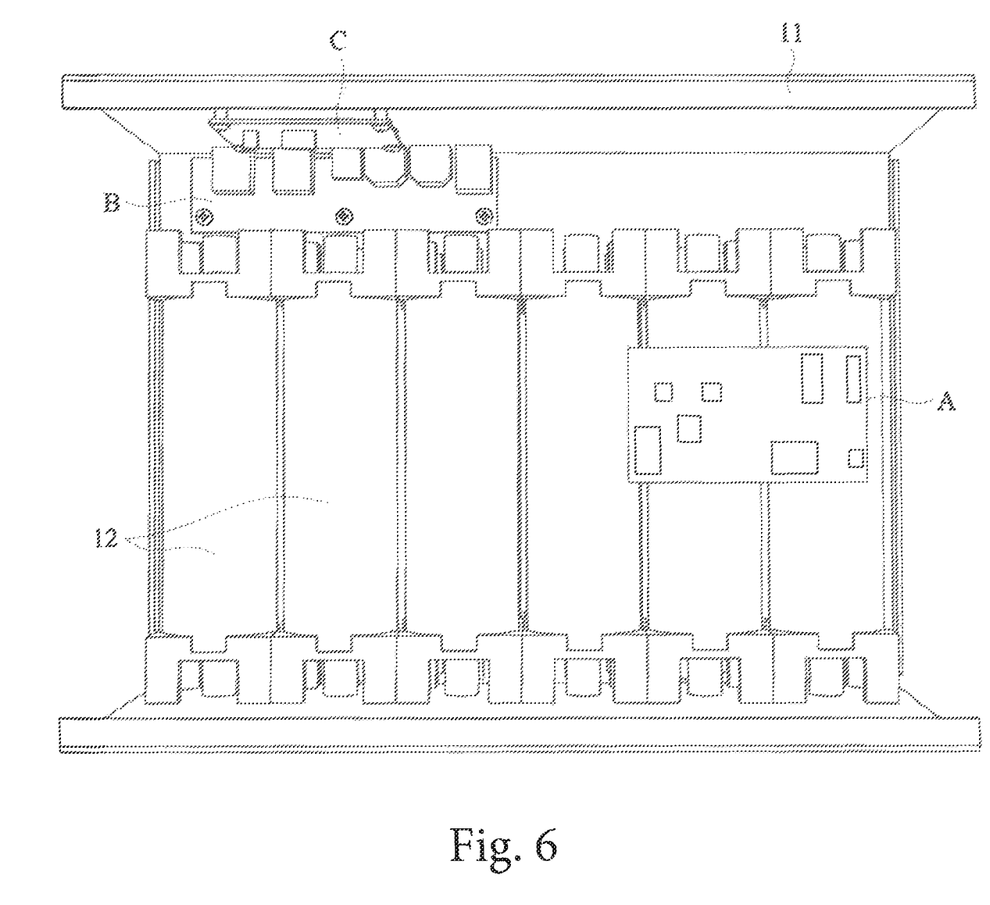
FIG. 6 is a schematic diagram showing a rechargeable battery according to the invention.

Refer to FIGS. 1 to 3, which are a schematic diagram showing a three-dimensional appearance of a power supply management device for intelligent motorcycle according to the invention, a schematic diagram showing an internal structure of a power supply management device according to the invention and a schematic diagram showing processing blocks of a power supply management system for intelligent motorcycle according to the invention, respectively. As shown in the figures, the invention is a power supply management device P for intelligent motorcycle, comprising a power device 1 and a power supply management system 2.

The power device 1 includes a housing 11, a rechargeable battery 12 provided on the housing 11, a heat dissipation module 13 provided on the housing 11, two grasp sections 14 provided on the housing 11, and a circuit board set 15 provided on the housing 11.

The power supply management system 2 is provided on the housing. The power supply management system 2 includes a processor 21 electrically connected to the rechargeable battery 12, an input module 22 connected to the processor 21, a link module 23 connected to the processor 21, a voltage modulation module 24 connected to the processor 21, a protection module 25 connected to the processor 21, and an output module 26 connected to the processor 21, wherein the processor 21 may serve for operation control and work computation of the power device 1, the input module 22, the link module 23, the voltage modulation module 24, the protection module 25 and the output module 26. Further, the processor 21 may also be connected to the AI computer 32 to manage and control the power device 1, the input module 22, the link module 23, the voltage modulation module 24, the protection module 25 and the output module 26.

In a preferred embodiment of the invention, the processor 21 may be an MCU central processor, a single chip, software or a logic circuit, in which a power control module is built in. Thereby, a huge amount of data control and computation processing may be performed, achieving stability and accuracy during operation to avoid generation of errors which may influence the computation operation.

In a preferred embodiment of the invention, the input module 22 and the output module 26 may be various electric connectors (e.g., USBs), such as USB communication ports 111 shown in various figures.

In a preferred embodiment of the invention, the link module 23 may serve for the Bluetooth communication protocol or other various wireless communication protocols.

In a preferred embodiment of the invention, the voltage modulation module 24 may modulate the voltage of DC19V, DC12V, or DC5V output from the rechargeable battery 12 of the power device 1, and in turn, to meet better requirements in actual use.

In a preferred embodiment of the invention, the protection module 25 cooperates with the rechargeable battery 12 of the power device 1 to perform over-current protection, short-circuit protection, over-voltage protection, low-voltage alert and over-temperature protection.

In a preferred embodiment of the invention, the processor 21 is further connected with a switch unit 27, the switch unit 27 serving for activation and deactivation of the rechargeable battery 12 of the power device 1.

Refer to FIGS. 1-3 and 6, the processor 21, the input module 22, the voltage modulation module 24, the protection module 25, the output module 26 comprised in the power supply management system 2 according to the invention may be disposed on the circuit board set 15. The circuit board set 15 comprises a circuit board A, a circuit board B, and a circuit board C, which is electrically connected to the rechargeable battery 12 for operation via panel units 111~119 disposed on the housing 11.

Figure 8:
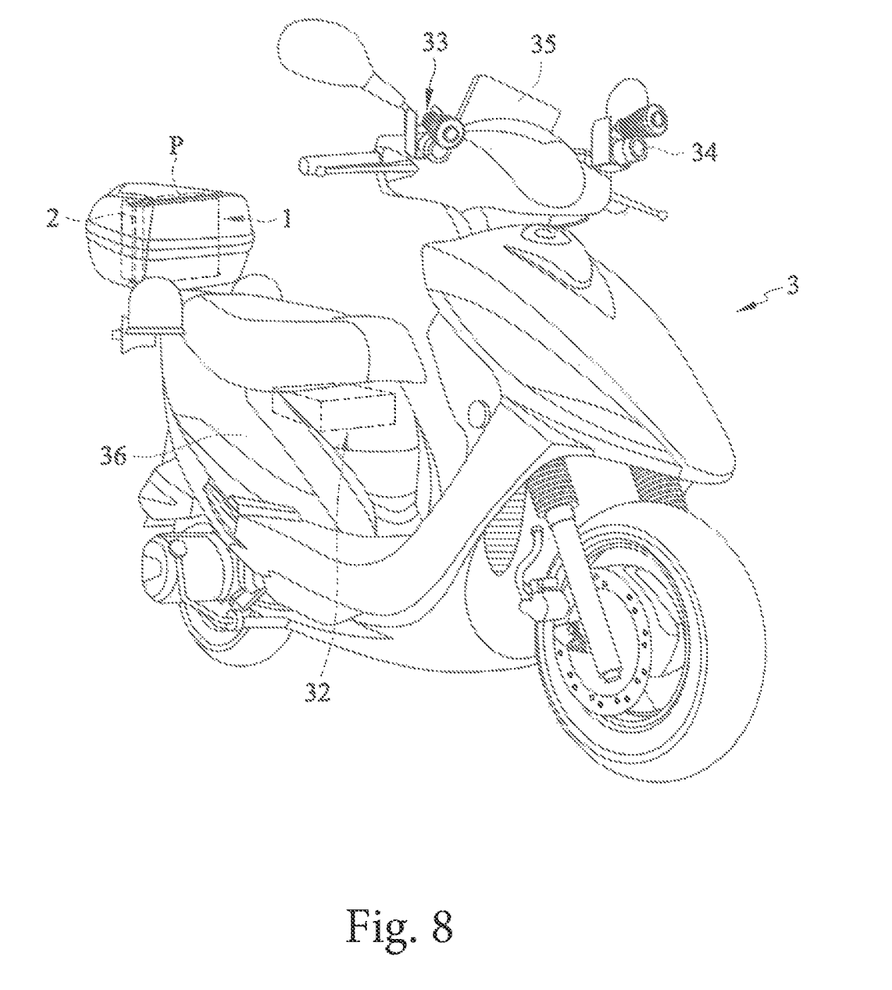
FIG. 8 is a schematic diagram showing an intelligent motorcycle equipped with the power supply management device according to the invention.
Figure 41:
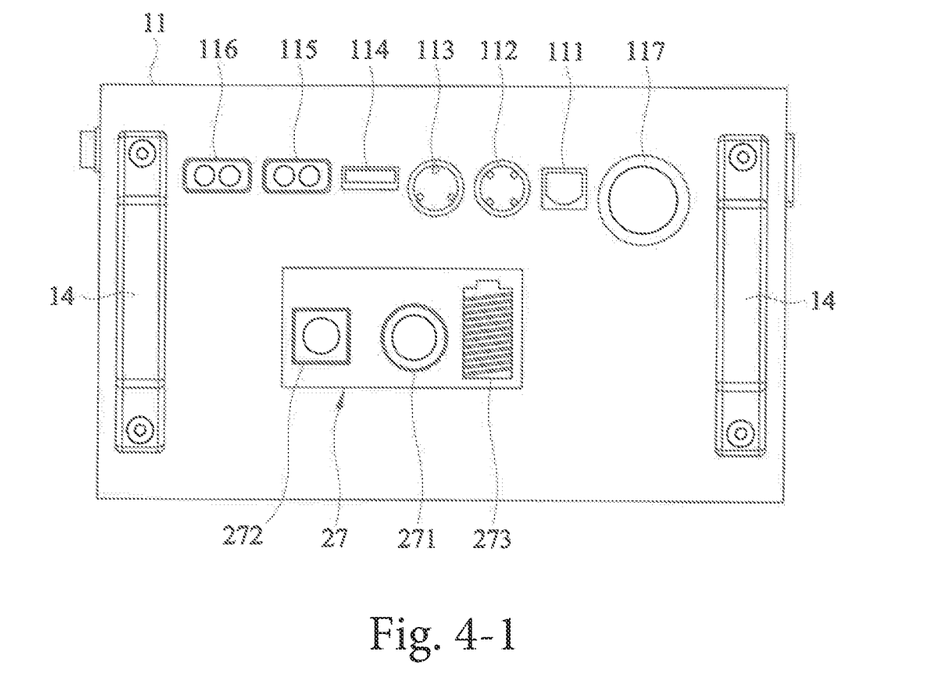
Figure 42:
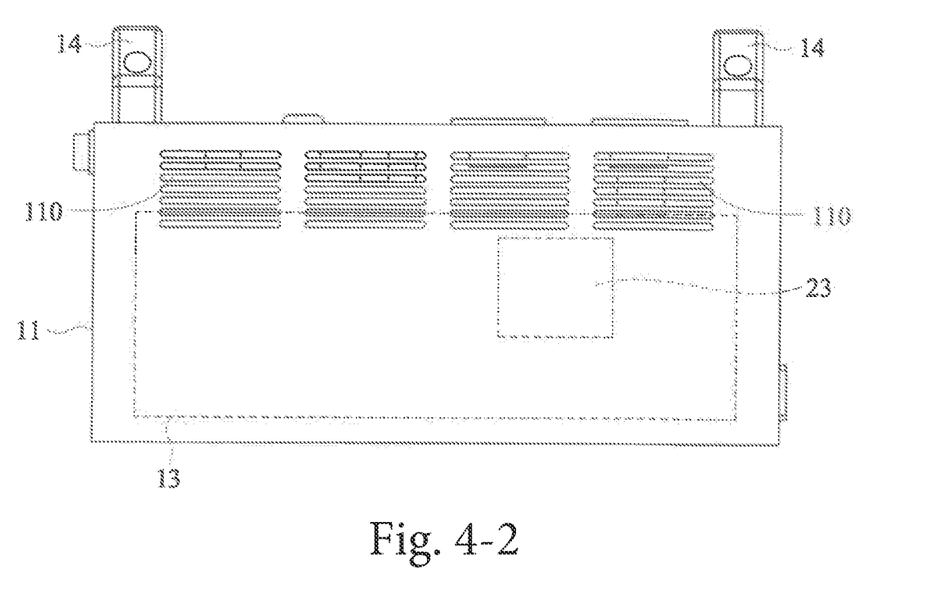

As shown in the top view of the power supply management device of FIG. 4-1 and FIG. 8, the power device 1 is provided with a USB communication port 111 for connecting to the AI computer 32, and a DC12V output port 112, a DC19V output port 113, a DC5V output port 114 for outputting three different voltages to the AI computer 32, the camera 33, the spotlight 34, the display device 35 or the heat dissipation device 36 for power supply management. Also, with the power control module of the MCU processor 21, a configuration status information and the AI computer 32 may be linked for communication and control. The panel units of the housing 11 mentioned above also comprises an emergency rescue power output joint 115, a power output remote control joint 116, an emergency rescue switch 117. Also, the switch unit 27 has an on/offkey 271, a reset key 272, and a power indicator 273.

Figure 51:
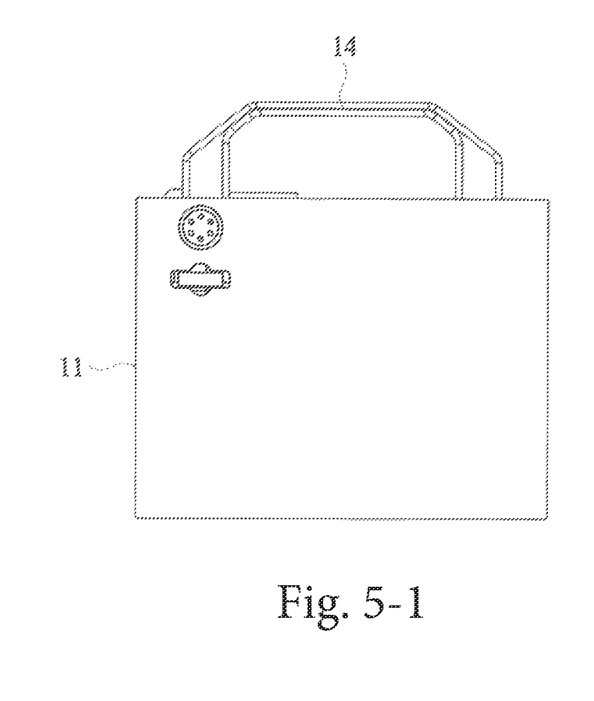
Figure 52:
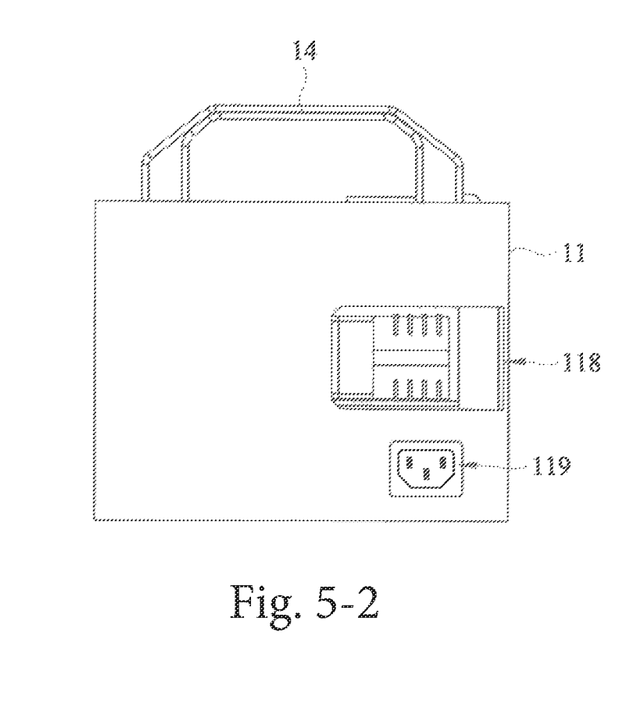

Refer to the left side view and the right side view of the power supply management device of FIG. 5-1 and FIG. 5-2 in the invention, the right side panel of the power device 1 is provided with a motorcycle charging input joint 115 and a external charging input joint 119, which may be applied for receiving power generated by the electric generator of an oil-fueled vehicle or motorcycle for charging, which may control input voltage/current values in a specified range by the power control module of the built-in MCU processor 21, and may control the charging/discharging timing of the on-vehicle battery, and an external fast charging AC joint disposed for powering the installed AI computer 32 on an electrical vehicle/motorcycle. The left side panel of the power device 1 has a power output control line and a slow-blow fuse.

In a preferred embodiment of the invention, the explosion-proof safety needs to be considered for the housing 11, which is made of stainless steel or aluminum alloy. The heating dissipation module 13 may be a fan set, and the housing 11 may be provided with heating dissipation holes 110 to match the heat dissipation module 13 for heat dissipation of the rechargeable battery 12 and the power supply management system 2, while an anti-raindrop mechanism needs to be considered for the heat dissipation holes 110; the rechargeable battery 12 may be a lithium-iron battery; the grasp sections 14 may have the effect of convenient lifting. Each of the panel units 111-119 adopts different styles/structures for discrimination, and an anti-falling, anti-raindrop outer cover may be disposed as need.

Figure 7:
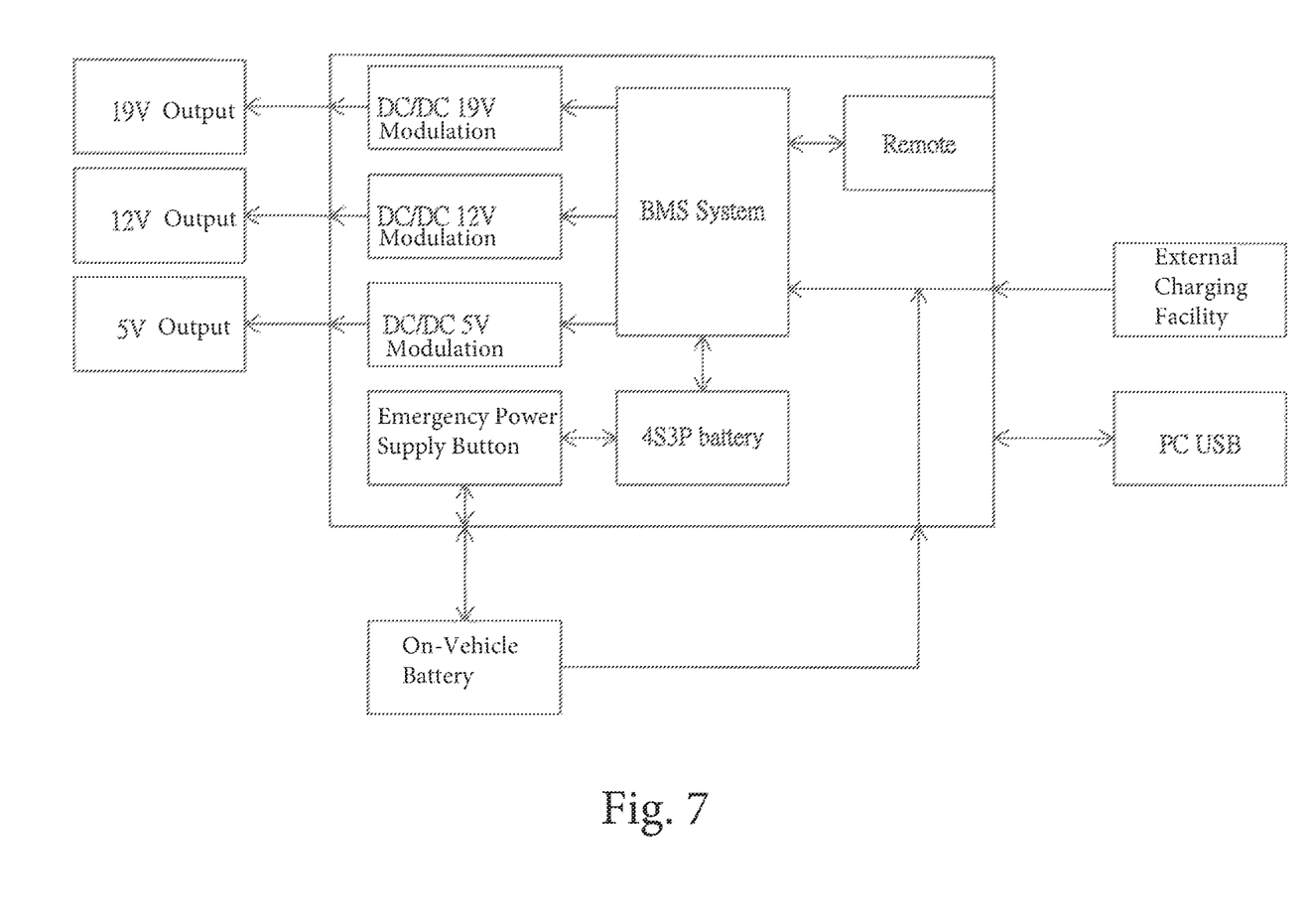
FIG. 7 is a block diagram showing a rechargeable battery according to the invention.

Refer to the block diagram for the rechargeable battery system in FIG. 7. In applying the invention, the battery 31 for activation of the intelligent motorcycle 3 may be electrically connected with the output module 26 of the power supply management system 2, or the power device 1 may cooperate with the power supply management system 2 to power the intelligent motorcycle 3, serving for power supply and power management when the intelligent motorcycle 3 is in various uses. Also, charging and power providing are available by utilizing the rechargeable battery 12 of the power device 1.

The link module 23 may start output of voltage/current through phone control or external remote. Further, the processor 21 may be connected to an AI computer for controlling, and in practical, may be charged with the power generated by an electric generator of an oil-fueled vehicle or motorcycle. Moreover, values of the input voltage/current may be controlled within the specified range by the processor 21, which may also control the charging and discharging timing of the on-vehicle battery of a vehicle. Furthermore, the processor 21 may also link with the AI computer for communication and controlling the configuration status information.

The output module 26 may be connected to an external control module to facilitate remote control of an AI computer to receive power; the output voltage may be modulated to three different voltage outputs of DC19V, DC12V, and DC5V via the voltage modulation module 24, which may perform power supply management for the AI computer 32, a camera 33, a spotlight 34, an external touch screen, a sensor, a heat dissipation system 36, a signal transmission device and a display device 35 etc.

The protection module 25 may serve for a complete safety protection mechanism, such as short-circuit prevention, abnormal temperature prevention, abnormal battery alert display, surge prevention protection, over-charging protection loop, over-voltage/current protection; and a rescue loop is provided for starting the intelligent motorcycle 3, an oil-fueled motorcycle, or for emergency power supply due to damage of the motorcycle battery for rescue.

The link module 23 may display charging voltage, charging current, charging safety, charging time through the smart phone APP instantly with respect to battery usage or charging status. The effective communication distance of the Bluetooth link may reach 15 meters. Also, a phone alert mechanism may be arranged to inform/remind the device of the message of fully charged battery. The deactivation/activation of charging may conducted by a self or smart phone.

The output module 26 (e.g., USB) is connected with the AI computer 32, and may store the data generated from operation of the power supply management system 2 in a folder file disposed in the AI computer 32, for the AI computer to conduct extraction, analysis and display operation. The activation and deactivation of the output module 26 may be controlled by the processor 21 detecting the power supply status from the computer.

The processor 21 of the power supply management system 2 is normally electrically connected with the battery 31 for activation of the intelligent motorcycle 3, such that the DC12V output from the rechargeable battery 12 of the power device 1 is modulated by the voltage modulation module 24 for power supply due to emergency rescue, wherein the processor 21 of the power supply management system 2 may detect a voltage value of the battery 31 for activation lower than DC5V, such that the voltage modulation module 24 modulates the output from the rechargeable battery 12 of the power device 1 to supply power to the battery 31 for activation. The input module 22 is activated when the voltage value of the battery 31 for activation is higher than DC13V; the input module 22 is deactivated when the voltage value of the battery 31 for activation is lower than DC12V.

In addition, since the on-vehicle battery of a regular motorcycle is used only for starting a motor or illumination or a direction light, if various external devices are installed on the motorcycle, no sufficient power could be provided to the external devices, so that a power supply management device P needs to be installed for providing sufficient power to the external devices. Moreover, the two sides on a rear wheel of the intelligent motorcycle 3 may be provided with two fixed bracket according to actual needs to link the right side and the left side storage compartments, respectively, wherein a second and a third rechargeable batteries are disposed in the two storage compartments, respectively. Each of the rechargeable batteries has a power of 100 Ah reserved, and may be connected in parallel with the power supply management device P installed in a rear storage compartment through a joint port to expand/increase the power to fulfill the need of large power consumption for various external equipments; and the overall capacity and status of the battery may be detected by the built-in BMS (Battery Management System), which is connected to the AI computer 32 for computation, and displayed on the display device 35 to inform the user of the power supply data/status and alert of battery capacity.

In summary, conventional function do be improved effectively with the power supply management device for intelligent motorcycle according to the invention, which may be electrically connected to an AI computer and a battery for activation of an intelligent motorcycle, serving for power supply and power management in various demands, and in turn, for effective control and management of the power to meet the practical operation requirement of the intelligent motorcycle, so that the invention is advantageous, practical and satisfies the needs of users to meet various requirements for application.

What is claimed is:

1. A power supply management device, including:
   a power device, wherein the power device includes a housing made of stainless steel or aluminum alloy, a rechargeable battery provided on the housing, two grasp sections provided on the housing, and a circuit board set provided on the housing; and
   a power supply management system, which is electrically connected to the power device, the power supply management system includes a processor, an input module connected to the processor, a link module connected to the processor, a voltage modulation module connected to the processor, a protection module connected to the processor, and an output module connected to the processor, wherein the power supply management system is provided on the housing and the processor is electrically connected to the rechargeable battery, wherein the power supply management system is provided on the housing and the processor is electrically connected to the rechargeable battery,
   wherein the processor is configured for operation control and work computation of the power device, the input module, the link module, the voltage modulation module, the protection module and the output module,
   wherein the processor includes a built-in power control module configured to link the processor, a configuration status information and an AI device for communication and control,
   wherein the power control module connects to the rechargeable battery, the rechargeable battery acting as a power source during operation of the AI device, a camera, a spotlight, a display device or a heat dissipation device, the power control module serving for power control when the rechargeable battery is supplying power.

2. The power supply management device according to claim 1, wherein the voltage modulation module can modulate the output voltage of DC19V, DC12V, or DC5V from the power device.

3. The power supply management device according to claim 1, wherein the processor is further connected with a switch unit, the switch unit serving for activation and deactivation of the power device, and the switch unit has an on/off key, a reset key, and a power indicator.

4. The power supply management device according to claim 1, wherein the power supply management system can detect a voltage value of the battery for activation lower than DC5V, such that the voltage modulation module can modulate the output of the power device supplying power to the battery for activation.

5. The power supply management device according to claim 1, wherein the input module is activated when the voltage value of the battery for activation is higher than DC 13V; the input module is deactivated when the voltage value of the battery for activation is lower than DC12V.

* * * * *